United States Patent
Hoshino

(10) Patent No.: US 8,081,864 B2
(45) Date of Patent: Dec. 20, 2011

(54) CAPTURED IMAGE RECORDING APPARATUS, CAPTURED IMAGE RECORDING METHOD, CAPTURED IMAGE REPRODUCING APPARATUS, CAPTURED IMAGE REPRODUCING METHOD, AND CAPTURED IMAGE RECORDING/REPRODUCING SYSTEM

(75) Inventor: Hiromi Hoshino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1261 days.

(21) Appl. No.: 11/667,162

(22) PCT Filed: Sep. 8, 2006

(86) PCT No.: PCT/JP2006/017913
§ 371 (c)(1),
(2), (4) Date: May 7, 2007

(87) PCT Pub. No.: WO2007/029832
PCT Pub. Date: Mar. 15, 2007

(65) Prior Publication Data
US 2008/0007633 A1  Jan. 10, 2008

(30) Foreign Application Priority Data
Sep. 8, 2005 (JP) ................................. 2005-261094

(51) Int. Cl.
*H04N 9/80* (2006.01)
*H04N 5/76* (2006.01)
*H04N 5/93* (2006.01)
(52) U.S. Cl. ......... 386/241; 386/238; 386/248; 386/278
(58) Field of Classification Search .................. 386/238, 386/241, 278, 248
See application file for complete search history.

(56) References Cited

U.S. PATENT DOCUMENTS
7,366,406 B2 * 4/2008 Hoshino et al. ............... 386/337
(Continued)

FOREIGN PATENT DOCUMENTS
EP  1 460 849 A1  9/2004
(Continued)

OTHER PUBLICATIONS
Extended Supplementary European Search Report dated Oct. 1, 2010 in corresponding European Application No. 06 79 7739.
(Continued)

*Primary Examiner* — Helen Shibru
(74) *Attorney, Agent, or Firm* — Oblon, Spivak, McClelland, Maier & Neustadt, L.L.P.

(57) ABSTRACT

An image of an object is picked up by an image processing unit (10) to acquire an image signal of variable frame rate. An audio signal is acquired by an audio processing unit (20) to generate an audio signal having the number of frames caused to be in conformity with the system frame rate to generate a recording signal of recording frame rate from the image signal of the variable frame rate and an audio signal having the number of frames caused to be in conformity with the system frame rate. In recording a recording signal of the recording frame rate onto or into a recording medium (35) by a recording/reproducing unit (30), discrimination information indicating image pick-up frame rate and system frame rate is recorded onto or into the recording medium (35), e.g., as MXF (Material Exchange Format) file along with the image signal of the variable frame rate and the audio signal having the number of frames caused to be in conformity with the system frame rate.

11 Claims, 9 Drawing Sheets

U.S. PATENT DOCUMENTS

| | | | |
|---|---|---|---|
| 7,471,314 B2 * | 12/2008 | Ogikubo | 348/207.99 |
| 2004/0081437 A1 * | 4/2004 | Asada et al. | 386/131 |
| 2005/0163492 A1 * | 7/2005 | Ueda et al. | 386/109 |

FOREIGN PATENT DOCUMENTS

| | | |
|---|---|---|
| JP | 2000 125210 | 4/2000 |
| JP | 2002-320203 A | 10/2002 |
| JP | 2004 180233 | 6/2004 |
| JP | 2004 334046 | 11/2004 |

OTHER PUBLICATIONS

Bruce Devlin et al., "Broadcast Wave and AES Audio in MXF", AES 25th international Conference: Metadata for Audio, Jun. 2004, XP 040506915, pp. 1-5.

* cited by examiner

CAPTURED IMAGE RECORDING APPARATUS, CAPTURED IMAGE RECORDING METHOD, CAPTURED IMAGE REPRODUCING APPARATUS, CAPTURED IMAGE REPRODUCING METHOD, AND CAPTURED IMAGE RECORDING/REPRODUCING SYSTEM

TECHNICAL FIELD

The present invention relates to a picked-up image recording apparatus, a picked-up image recording method, a picked-up image reproducing apparatus, a picked-up image reproducing method, and a picked-up image recording/reproducing system suitable when used in recording/reproducing an image signal of variable frame rate through a recording medium.

This Application claims priority of the Japanese Patent Application No. 2005-261094, field on Sep. 8, 2005, the entirety of which is incorporated by reference herein.

BACKGROUND ART

Hitherto, in conventional movie production, etc., in order to have to ability to acquire special video effect, there is performed a photographing in which photographing speed of film camera, i.e., the number of frames per second is varied. For example, when it is assumed that photographing operation is performed at a speed higher than ordinary speed and reproducing operation is performed at ordinary speed, reproduced image results in slow reproduced image. For this reason, it is possible to observe, easily and in detail, high speed operation such that droplet is fallen onto water surface. Moreover, when it is assumed that photographing operation is performed at a speed lower than ordinary speed and reproducing operation is performed at an ordinary speed, reproduced image results in high speed reproduced image. For this reason, feeling of speed at grappling or fight scene or car chase scene, etc. is enhanced so that it is possible to perform image presentation having high presence.

Moreover, in television program production, etc., digitization of image pick-up, editing and/or sending, etc. of program is performed, whereas digitization is being performed also at movie production, etc. by realization of high picture quality and/or low cost of equipment followed by development of digital technology.

Further, there is provided an image pick-up apparatus which permits frame rate to be variable in order to have ability to easily obtain special video effect such as high speed reproduction or slow reproduction, etc. (e.g., see Japanese Patent Application Laid Open No. 2000-125210 publication). If the above-mentioned image pick-up apparatus is used to perform image pick-up operation in the state where frame rate is caused to be lower than the predetermined frame rate to reproduce the picked-up image at a predetermined frame rate, it is possible to obtain high speed reproduced image with ease. In addition, if image pick-up operation is performed in the state where the frame rate is caused to be high to reproduce the picked-up image at a predetermined frame rate, it is possible to obtain slow reproduction image with ease. For example, a signal recorder, e.g., video tape recorder, etc. in which frame rate at the time of recording an image signal (hereinafter referred to as "recording frame rate") is constant is used, and an image pick-up apparatus serves to generate a signal in which frame of picked-up image is included in a signal having recording frame rate by variable frame rate to deliver the signal thus generated to the signal recording apparatus such as video tape recorder (VTR), etc.

The signal recorder records variable speed frame rate picked-up image onto or into a recording medium by using an image signal which has been delivered from the image pick-up device. When the variable speed frame rate picked-up image which has been recorded on or in the recording medium is reproduced, in the case where the frame rate of the variable speed frame rate picked-up image is lower than frame rate at the time of reproduction (hereinafter referred to as "reproduction frame rate"), motion of object becomes faster as compared to actual motion, whereas in the case where the frame rate of the variable speed frame rate picked up image is higher than the reproduction frame rate, motion of object becomes slow as compared to actual motion. For this reason, it is possible to easily obtain special video effect.

DISCLOSURE OF THE INVENTION

PROBLEMS TO BE SOLVED BY THE INVENTION

Meanwhile, in the case where variable speed picture recording is performed, only image was recorded at the film camera in the prior art. Also when VTR is employed, because synchronization processing of image and sound is not used, image was taken in by image pick-up apparatus capable of changing frame rate and sound was caused to undergo muting to record only variable speed frame rate picked up image, and to record sound corresponding to variable speed frame rate picked up image by separate equipment to separately process them to realize special effect.

As stated above, in order to realize special effect, it is required to separately record image and sound to process them. As a result, not only various equipments therefor are required, but also it takes much labor and time.

In view of the problems of the prior art as described above, an object of the present invention is to have ability to record/reproduce sound caused to be in conformity with variable speed of image along with variable speed frame rate picked-up image.

A picked-up image recording apparatus according to the present invention includes: image processing means for picking up an image of an object to output an image signal of variable frame rate; audio processing means for acquiring an audio signal to generate an audio signal having the number of frames caused to be in conformity with system frame rate to output the audio signal thus obtained; recording means for recording, onto or into a recording medium, the image signal which has been acquired by the image processing means and the audio signal which has been acquired by the audio processing means; and control means for controlling operations of these respective means thus to record, in recording a recording signal of the recording frame rate from the image signal of the variable frame rate and the audio signal having the number of frames caused to be in conformity with the system frame rate to record the recording signal of the recording frame rate onto or into the recording medium, the image pick-up frame rate and the system frame rate along with the image signal of the variable frame rate and the audio signal having the number of frames caused to be in conformity with the system frame rate onto or into the recording medium as file.

In the picked-up image recording apparatus according to the present invention, there is employed an approach to record, onto or into the recording medium, as the recording signal, metadata of the number of variable frames and the number of system frames of image pick-up operation along with, e.g., image signal of the variable frame rate and audio signal having the number of frames caused to be in conformity with the system frame rate.

Moreover, in the picked-up image recording apparatus according to the present invention, there is employed an approach to record, onto or into the recording medium as MXF (Material Exchange Format) file, image pick-up frame rate and system frame rate along with image signal of the variable frame rate and audio signal having the number of frames caused to be in conformity with the system frame rate.

Further, in the picked-up image recording apparatus according to the present invention, there is employed an approach to record, onto or into the recording medium, as MP4 file, image pick-up frame rate and system frame rate along with image signal of the variable frame rate and audio signal having the number of frames caused to be in conformity with the system frame rate.

Moreover, a picked-up image recording method according to the present invention includes the steps of: picking up an image of an object to acquire an image signal of variable frame rate, and to acquire an audio signal to generate an audio signal having the number of frames caused to be in conformity with system frame rate; and recording, in generating a recording signal of recording frame rate from the image signal of the variable frame rate and the audio signal having the number of frames caused to be in conformity with the system frame rate thus to record the recording the recording signal of the recording frame rate onto or into the recording medium, image pick-up frame rate and system frame rate along with the image signal of the variable frame rate and the audio signal having the number of frames caused to be in conformity with the system frame rate onto or into the recording medium as file.

Further, the present invention is directed to a picked-up image reproducing apparatus adapted for reproducing, from a recording medium where image pick-up frame rate and system frame rate are recorded as file along with an image signal of variable frame rate in which an image of an object has been picked up and an audio signal having the number of frames caused to be in conformity with system rate, the image signal and the audio signal, which includes: reproduction control means for reading thereinto the image pick-up frame rate and the system frame rate from the recording medium to determine reproduction rate of the audio signal from the ratio between the image pick-up frame rate and the system frame rate; reproduction image processing means for outputting, as an image signal of reproduction frame rate, the image signal of the variable frame rate which is read out from the recording medium; and reproduction audio processing means for generating an audio signal of the reproduction rate which has been determined by the reproduction control means from the audio signal having the number of frames caused to be in conformity with the system frame rate which is read out from the recording medium to output the audio signal thus generated, thus to generate an audio signal of the reproduction rate which has been determined from the ratio between the image pick-up frame rate and the system frame rate to thereby reproduce the audio signal at the same speed as that of the image signal of the reproduction frame rate.

In the picked-up image reproducing apparatus according to the present invention, there is employed an approach in which, prior to reading out, from a recording medium where metadata of the number of variable frames and the number of system frames is recorded, as the recording signal, along with image signal of the variable frame rate and audio signal having the number of frames caused to be in conformity with the system frame rate, the metadata is read out to acquire the image pick-up frame rate and the system frame rate.

Moreover, in the picked-up image reproducing apparatus according to the present invention, from the recording medium where the image pick-up frame rate and the system frame rate are recorded as MXF (Material Exchange Format) file along with the image signal of the variable frame rate and the audio signal having the number of frames caused to be in conformity with the system frame rate, the image signal and the audio signal are reproduced.

Further, in the picked-up image reproducing apparatus according to the present invention, from the recording medium where the image pick-up frame rate and the system frame rate are recorded as MP4 file along with the image signal of the variable frame rate and the audio signal having the number of frames caused to be in conformity with the system frame rate, the image signal and the audio signal are reproduced.

Moreover, the present invention is directed to a picked-up image reproducing method of reproducing, from a recording medium where image pick-up frame rate and system frame rate are recorded as file along with an image signal of variable frame rate at which an image of an object has been picked up and an audio signal having the number of frames caused to be in conformity with the system frame rate, the image signal and the audio signal, the picked-up image reproducing method including the steps of: reading thereinto the image pick-up frame rate and the system frame rate from the recording medium to determine reproduction rate of an audio signal from the ratio between the image pick-up frame rate and the system frame rate; outputting, as an image signal of the reproduction frame rate, the image signal of the variable frame rate which is read out from the recording medium, and generating the audio signal of the reproduction rate from the audio signal having the number of frames caused to be in conformity with the system frame rate which is read out from the recording medium to output the audio signal thus generated; and reproducing the audio signal at the same speed as that of the image signal of the reproduction frame rate.

Further, a picked-up image recording/reproducing system according to the present invention includes: a recording system comprising image processing means for picking up an image of an object to output an image signal of variable frame rate, audio processing means for acquiring an audio signal to generate an audio signal having the number of frames caused to be in conformity with system frame rate to output the audio signal thus obtained, recording means for recording, onto or into a recording medium, the image signal which has been acquired by the image processing means and the audio signal which has been acquired by the audio processing means, and control means for controlling operations of these respective means to record, in generating a recording signal of recording frame rate from an image signal of the variable frame rate and an audio signal having the number of frames caused to be in conformity with the system frame rate to record the recording signal of the recording frame rate onto or into the recording medium, image pick-up frame rate and system frame rate onto or into the recording medium as file along with the image signal of the variable frame rate and the audio signal having the number of frames caused to be in conformity with the system rate; and a reproducing system comprising reproduction control means for reading thereinto image pick-up frame rate and system frame rate from the recording medium to determine reproduction rate of an audio signal from the ratio between the image pick-up frame rate and the system frame rate, reproduction image processing means for outputting, as an image signal of the reproduction frame rate, an image signal of the variable frame rate which is read out from the recording medium, and reproduction audio processing means for generating an audio signal of reproduction rate which has been determined by the reproduction control means from an audio signal having the number of frames caused to be in conformity with the system frame rate which is read out from the recording medium thus to generate an audio signal of reproduction rate which has been determined from the ratio between the image pick-up frame rate and the system frame rate to thereby reproduce the audio signal at the same speed as that of the image signal of the reproduction frame rate.

In the present invention thus featured, there is employed an approach to pick up image of object to acquire image signal of variable frame rate, and to acquire audio signal to generate audio signal having the number of frames caused to be in conformity with the system frame rate to generate a recording signal of recording frame rate from the image signal of the variable frame rate and the audio signal having the number of frames caused to be in conformity with the system frame rate to record, at the time of recording the recording signal of the recording frame rate onto or into the recording medium, the image pick-up frame rate and the system frame rate as file onto or into the recording medium along with the image signal of the variable frame rate and the audio signal having the number of frames caused to be in conformity with the system frame rate. Accordingly, it is possible to read thereinto image pick-up frame rate and system frame rate from the recording medium to determine reproduction rate of the audio signal from the ratio between the image pick-up frame rate and the system frame rate to output the image signal of the variable frame rate which is read out from the recording medium as image signal of reproduction frame rate, and to generate an audio signal of reproduction rate which has been determined by the reproduction control means from the audio signal having the number of frames caused to be in conformity with the system frame rate which is read out from the recording medium to output the audio signal thus generated to have ability to reproduce the audio signal at the same speed as that of the image signal of the reproduction frame rate. Accordingly, it is possible to record and reproduce an image signal of variable speed frame rate through the recording medium along with the audio signal. In addition, image, sound and metadata are recorded together, thereby making it possible to record and reproduce sound caused to be in conformity with variable speed of image without performing special processing.

Still further objects of the present invention and practical merits obtained by the present invention will become more apparent from the explanation which will be given below.

BEST MODE FOR CARRYING OUT THE INVENTION

Preferred embodiments of the present invention will now be described in detail with reference to the attached drawings.

Figure 1:
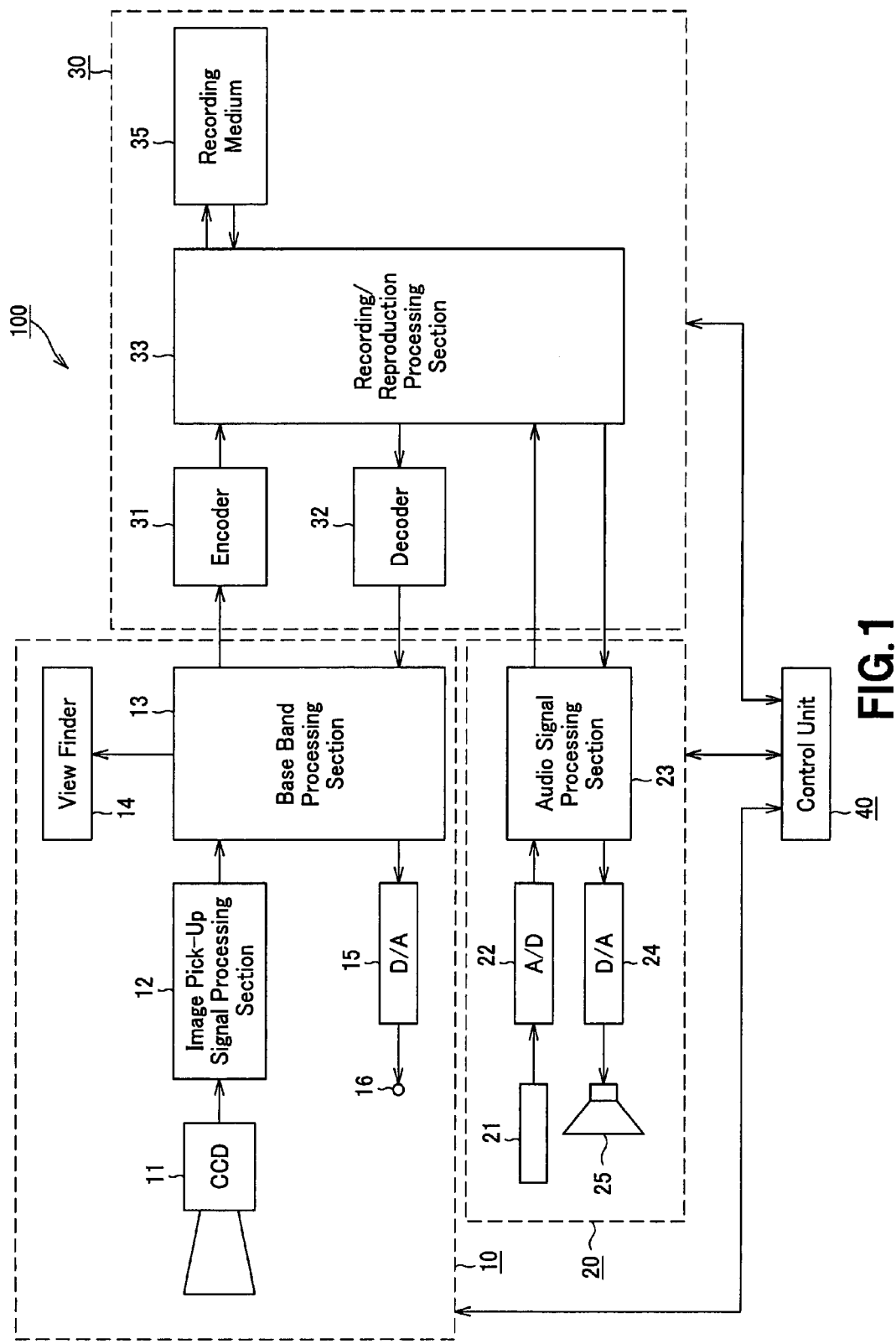
FIG. 1 is a block diagram showing an example of the configuration of picked-up image recording/reproducing system to which the present invention is applied.

The present invention is applied to, e.g., a picked-up image recording/reproducing system 100 constituted as shown in FIG. 1.

The picked-up image recording/reproducing system 100 is composed of an image processing unit 10 for acquiring an image signal, an audio processing unit 20 for acquiring an audio signal, a recording/reproducing unit 30 which is connected to the image processing unit 10 and the audio processing unit 20, and a control unit 40 for controlling the operations of these units.

The image processing unit 10 is composed of an image pick-up section 11 constituted by using solid-state image pick-up device, e.g., CCD (Charge Coupled Device), etc., a base band processing section 13 supplied, through an image pick-up signal processing unit 12, with an image pick-up signal which has been obtained by the image pick-up section 11, and a view finder 14 and a D/A converter 15, etc. which are connected to the base band processing section 13, wherein the base band processing section 13 is connected to the recording/reproducing unit 30.

The image pick-up section 11 of the image processing unit 10 has a function to allow the image pick-up frame rate to be variable to output a variable speed frame rate pick-up image signal, and serves to control the operation of the image pick-up section 11 by a control signal from the control unit 40 to control, e.g., charge storage time period and/or read-out timing of the image pick-up charge, etc. of the CCD image sensor to thereby permit the image pick-up frame rate to be variable.

The image pick-up signal processing section 12 serves to amplify an image pick-up signal of the variable frame rate delivered from the image pick-up section 11 thereafter to remove noise component. Moreover, the image pick-up signal processing section 12 serves to convert the noise-removed image signal into a digital signal thereafter to perform feedback clamping processing, flare correction, correction processing with respect to defect of image pick-up device, and/or process processing, etc. to deliver the processed image signal to the base band processing unit 13.

Further, the base band processing section 13 delivers an image signal of the variable frame rate delivered from the image pick-up signal processing section 12 to the recording/reproducing unit 30, and to convert frame rate of the image signal of the variable speed frame rate to thereby generate a view finder signal to deliver it to the view finder 14. By delivering the view finder signal to the view finder 14 in this way to display picked-up image, etc., it is possible to confirm image pick-up state, e.g., position, picture angle and/or brightness, etc. of object. Further, the base band processing unit 13 converts frame rate of the image signal of the variable speed frame rate which has been reproduced by the recording/reproducing unit 30 to thereby generate a reproduction image signal of output frame rate to deliver it to the D/A converter 15. The D/A converter 15 converts the reproduction image signal into an analog signal to output the analog signal thus obtained from an output terminal 16 to the external.

In addition, the audio processing unit 20 is composed of a microphone 21, an A/D converter 22 supplied with an audio signal which has been obtained by the microphone 21, an audio signal processing section 23 connected to the A/D converter 22, a D/A converter 24 connected to the audio signal processing section 23, and a speaker 25 connected to the D/A converter 24, etc., wherein the audio signal processing section 23 is connected to the recording/reproducing unit 30.

In the audio processing unit 20, in the audio signal processing section 23 supplied with an audio signal in which an audio signal which has been obtained by the microphone 21 is converted into a digital signal by the A/D converter 22, an audio signal having the number of frames caused to be in conformity with system frame rate of an image signal obtained by the image processing unit 10 is generated to deliver the audio signal thus obtained to the recording/reproducing unit 30. Moreover, the audio signal processing section 23 delivers, to the D/A converter 24, an audio signal which has been reproduced at a reproduction speed calculated from metadata. The D/A converter 24 converts the reproduced audio signal into an analog signal to output the analog signal thus obtained from the speaker 25.

Further, the recording/reproducing unit 30 is composed of an encoder 31 and a decoder 32 which are connected to the base band processing section 13 of the image processing unit 10, the audio signal processing section 23 of the audio processing unit 20, and a recording/reproduction section 33 which is connected to the encoder 31 and the decoder 32.

The encoder 31 in the recording/reproducing unit 30 performs compression-processing of an image signal of variable frame rate delivered from the base band processing section 13 of the image processing unit 10 to generate an image signal of recording frame rate and discrimination information indicating image pick-up frame rate and system frame rate of the image signal of the recording frame rate to deliver the image signal of the recording frame rate and the discrimination information to the recording/reproduction processing section 33.

Further, the recording/reproduction processing section 33 serves to collect an audio signal A having the number of frames caused to be in conformity with the system frame rate delivered from the audio signal processing section 23 of the audio processing unit 20, and the image signal V and the discrimination information which have been generated by the recording/reproduction processing section 33 into A/V data to generate a recording signal of recording frame rate in which error correction code is added every recording unit as file to record the recording signal thus obtained onto or into a recording medium 35 such as optical disc or semiconductor memory, etc.

Namely, in this picked-up image recording/reproducing system 100, the recording system is constituted by the image processing unit 10 for acquiring an image signal, the audio processing unit 20 for acquiring an audio signal, the recording/reproducing unit 30 which is connected to the image processing unit 10 and the audio processing section 20, and the control unit 40 for controlling these operations. The image processing unit 10 is caused to pick up an image of an object to acquire an image signal of variable frame rate XF, and to acquire an audio signal by the audio processing unit 20 to generate a recording signal of recording frame rate from the image signal of the variable frame rate and the audio signal having the number of frames caused to be in conformity with the system frame rate thus to record, at the time of recording the recording signal of the recording frame rate onto or into the recording medium 35 by the recording/reproducing unit 30, onto or into the recording medium 35, the discrimination information, i.e., image pick-up frame rate and system frame rate as MXF (Material Exchange Format) file, for example, along with the image signal of the variable frame rate and the audio signal having the number of frames caused to be in conformity with the system frame rate by the recording/reproducing section 33 of the recording/reproducing unit 30.

Figure 2:
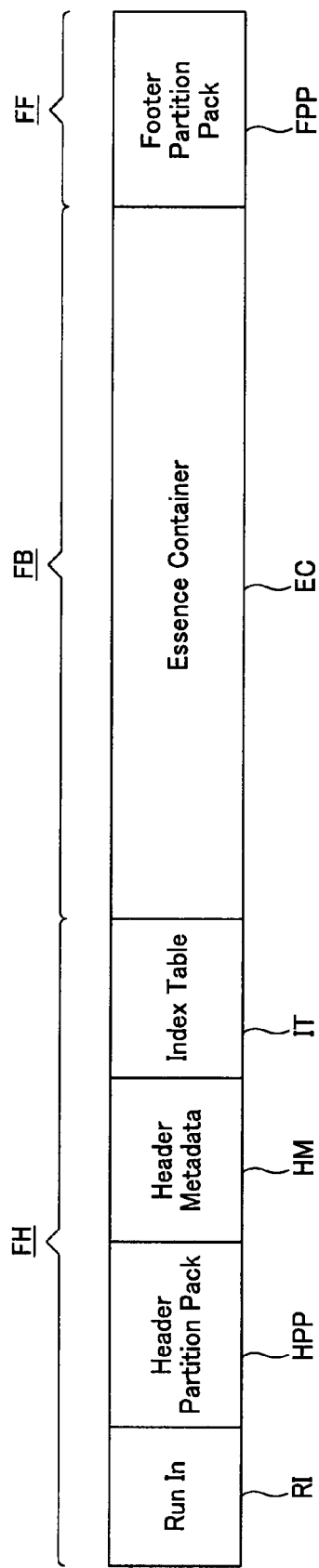
FIG. 2 is a view showing, in a model form, file structure of MXF file employed as file format of a recording signal to be recorded onto or into a recording medium in the picked-up image recording/reproducing system.
Figure 3:
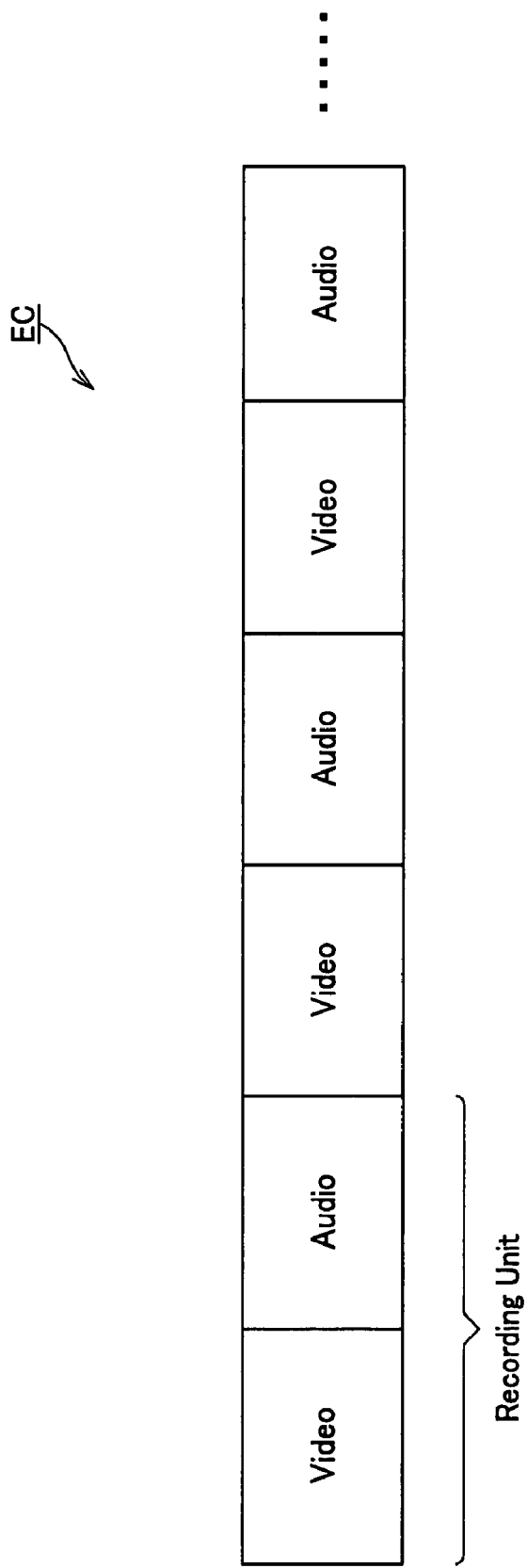
FIG. 3 is a view showing, in a model form, the content of file body in the MXF file.

Here, as shown in FIG. 2, the MXF file consists of file header FH, file body FB, and file footer FF, wherein the file header FH consists of run-in RI, header partition pack HPP, metadata HM, and index table IT, and includes metadata, etc. with respect to partition information and information relating to the entirety of file. Further, as shown in FIG. 3, the file body FB consists of essence container EC in which video files and audio files are repeatedly inserted one after another. As the header metadata HM, variable speed recording flag, image pick-up frame rate and system frame rate, i.e., the discrimination information are added to the file body FB along with time code and/or VAUX, etc. as the header metadata HM. In addition, the file footer FF consists of footer portion pack indicating end of file.

In this example, in the picked-up image recording/reproducing system 100, the file format of signal to be recorded onto or into the recording medium 35 is not limited to the above-mentioned MXF file, but there may be employed a file format which can record the discrimination information, i.e., the image pick-up frame rate and the system frame rate along with image signal of the variable frame rate and audio signal having the number of frames caused to be in conformity with the system frame rate, and, e.g., MP4 file, etc. may be also employed.

Moreover, the recording/reproducing unit 30 delivers a reproduced image signal obtained by reproducing A/V data from the recording medium 35 by the recording/reproduction processing section 33 to the base band processing section 13 of the image processing unit 10 through the decoder 32, and delivers a reproduced audio signal having the number of frames caused to be in conformity with the system rate of the image signal obtained by reproducing the A/V data from the recording medium 35 to the audio signal processing section 23 of the audio processing unit 20.

Further, the image processing unit 10 delivers the reproduced image signal of the variable frame rate, which is obtained by reproducing A/V data from the recording medium 35, from the base band processing section 13 of the image processing unit 10 to the D/A converter 15 as a reproduced image signal of the variable frame rate to convert the reproduced image signal into an analog signal by the D/A converter 15 to output the analog signal thus obtained from the output terminal 16 to the external.

Moreover, the audio processing unit 20 generates, by the audio signal processing section 23, audio signals of reproduction rate designated by the control unit 40 from a reproduced audio signal obtained by reproducing A/V data from the recording medium 35, i.e., a reproduced audio signal having the number of frames caused to be in conformity with the system rate of the image signal to deliver an audio signal collected on the frame basis to the D/A converter 24 to convert the audio signal of the reproduction rate into an analog signal by the D/A converter 24 to output the analog signal thus obtained from the speaker 25.

Here, prior to reading out the image signal of the variable frame rate and the audio signal having the number of frames caused to be in conformity with the system frame rate from the recording medium 35, the control unit 40 reads out, by the recording/reproducing unit 30, the metadata from the recording medium 35 to acquire the image pick-up frame rate and the system frame rate to determine reproduction rate of the audio signal from the ratio between the image pick-up frame rate and the system frame rate which have been acquired.

Namely, in this picked-up image recording/reproducing system 100, the reproducing system is constituted by the image processing unit 10, the audio processing unit 20, the recording/reproducing unit 30 which is connected to the image processing unit 10 and the audio processing unit 20, and the control unit 40 for controlling these operations, and serves to read thereinto, by the recording/reproducing unit 30, the image pick-up frame rate and the system frame rate from the recording medium 35 to determine, by the control unit 40, reproduction rate of the audio signal from the ratio between the image pick-up frame rate and the system frame rate to output an image signal of the variable frame rate which is read out from the recording medium 35 as an image signal of reproduction frame rate by the image processing unit 10, and to generate an audio signal of the reproduction rate by the audio processing unit 20 from the audio signal having the number of frames caused to be in conformity with the system frame rate which is read out from the recording medium 35 to output the audio signal thus obtained to reproduce the audio signal at the same speed as that of the image signal of the reproduction frame rate.

Here, in this picked-up image recording/reproducing system 100, in performing recording/reproduction of an image signal, there are the ordinary mode where the ordinary frame rate, e.g., 30 frames/sec. is designated as frame rate to perform recording/reproduction of the image signal and the variable speed mode where frame rate except for 30 frames/sec. is designated to perform recording/reproduction of image signal. The operation mode is set by the control unit 40.

Figure 4:
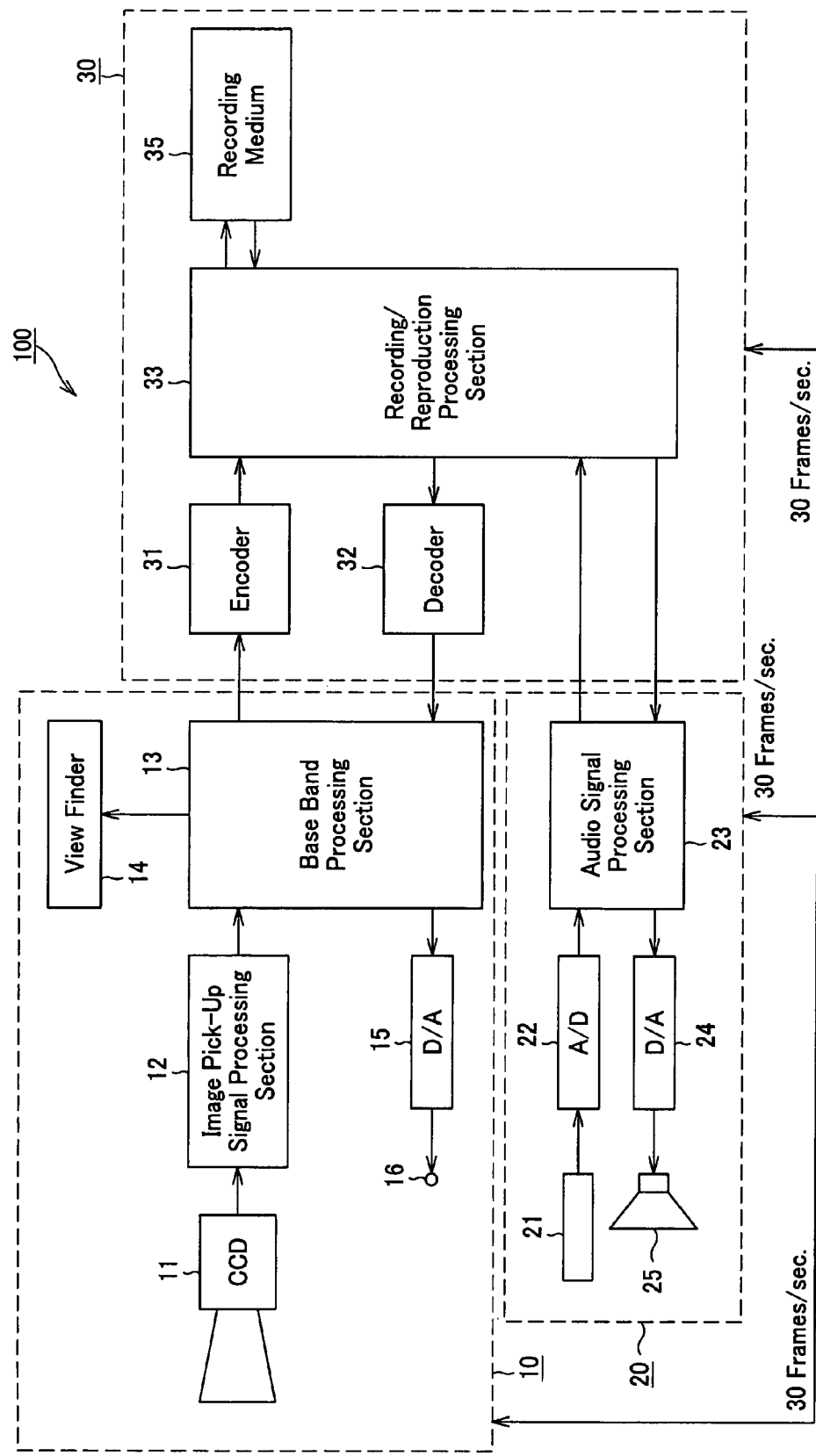
FIG. 4 is a block diagram used for explanation of operation of ordinary recording mode in the picked-up image recording/reproducing system.
Figure 5:
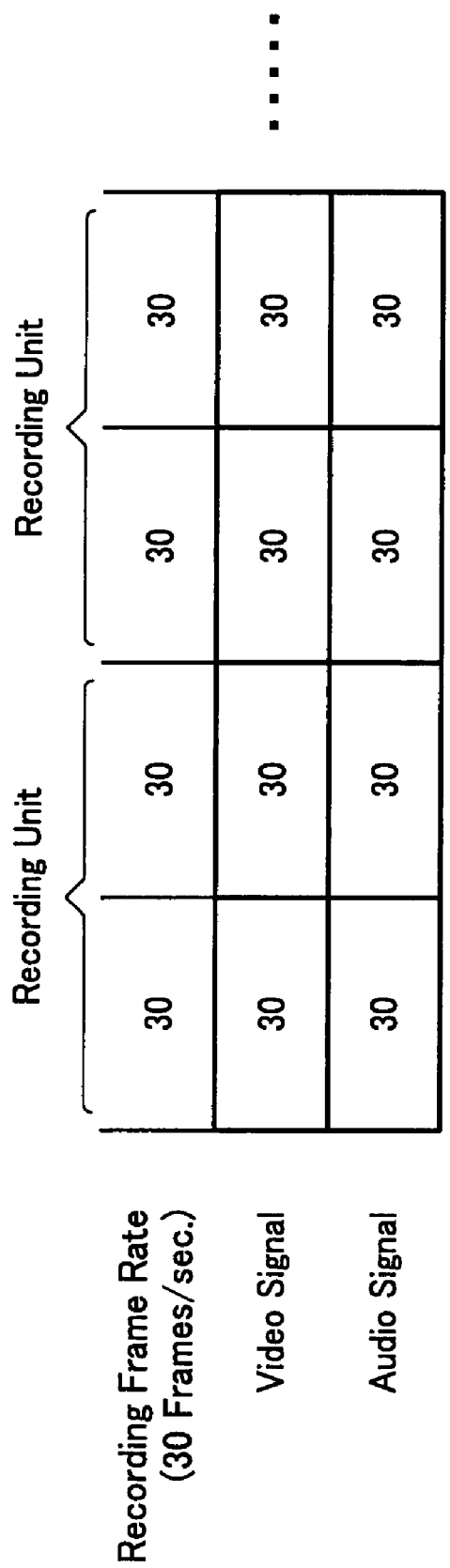
FIG. 5 is a view showing, in a model form, recording state in the ordinary recording mode.

For example, in the case where the ordinary mode is set by the control unit 40 as shown in FIG. 4 to acquire, by the image pick-up section 11, an image signal having ordinary frame rate, e.g., 30 frames/sec. to perform recording/reproduction through the recording medium 35 by the recording/reproducing unit 30, an audio signal of frame rate, i.e., the number of frames corresponding to 30 frames/sec. of the image signal is acquired by the audio processing unit 20 to collect, at the recording/reproducing unit 30, into A/V data corresponding to 30 frames in which an audio signal which has been acquired by the audio processing unit 20 is added to an image signal in which image signal of 30 frames/sec. acquired by the image processing unit 10 is caused to undergo compression processing by the encoder 31 to generate, by the recording/reproduction processing section 33, a recording signal having recording frame rate (30 frames/sec.) in which error correction code is attached every unit to record the recording signal thus obtained onto or into the recording medium 35.

Further, in the case of reproducing an image signal of 30 frames/sec. which has been recorded onto or into the recording medium 35, A/V data is reproduced every the recording unit from the recording medium 35 at the recording/reproduction processing section 33 to thereby obtain a compressed image signal of 30 frames/sec. and an audio signal having the number of frames corresponding to the frame rate of the image signal, i.e., 30 frames/sec.

The compressed image signal of 30 frames/sec. is caused to undergo expansion processing at a decoder 32 so that it is returned to original image signal of 30 frames/sec. The image signal thus obtained is delivered from the base band processing section 13 to the D/A converter 15 as a reproduced image signal of the output frame rate, and is converted into an analog signal by the D/A converter 15. The analog signal thus obtained is outputted from the output terminal 16 to the external.

Moreover, the audio signal corresponding to the frame rate of the image signal, i.e., 30 frames/sec. are collected into a signal on the frame basis by the audio signal processing section 23 of the audio processing unit 20. The audio signal thus obtained is delivered to the D/A converter 24, and is converted into an analog signal by the D/A converter 24. The analog signal thus obtained is outputted from the speaker 25.

Namely, in this picked-up image recording/reproducing system 100, in the ordinary mode, 30 frames/sec. is caused to be the system frame rate. The picked-up image recording/reproducing system is operative at the system rate where the recording frame rate and the reproduction frame rate are both 30 frames/sec.

Figure 6:
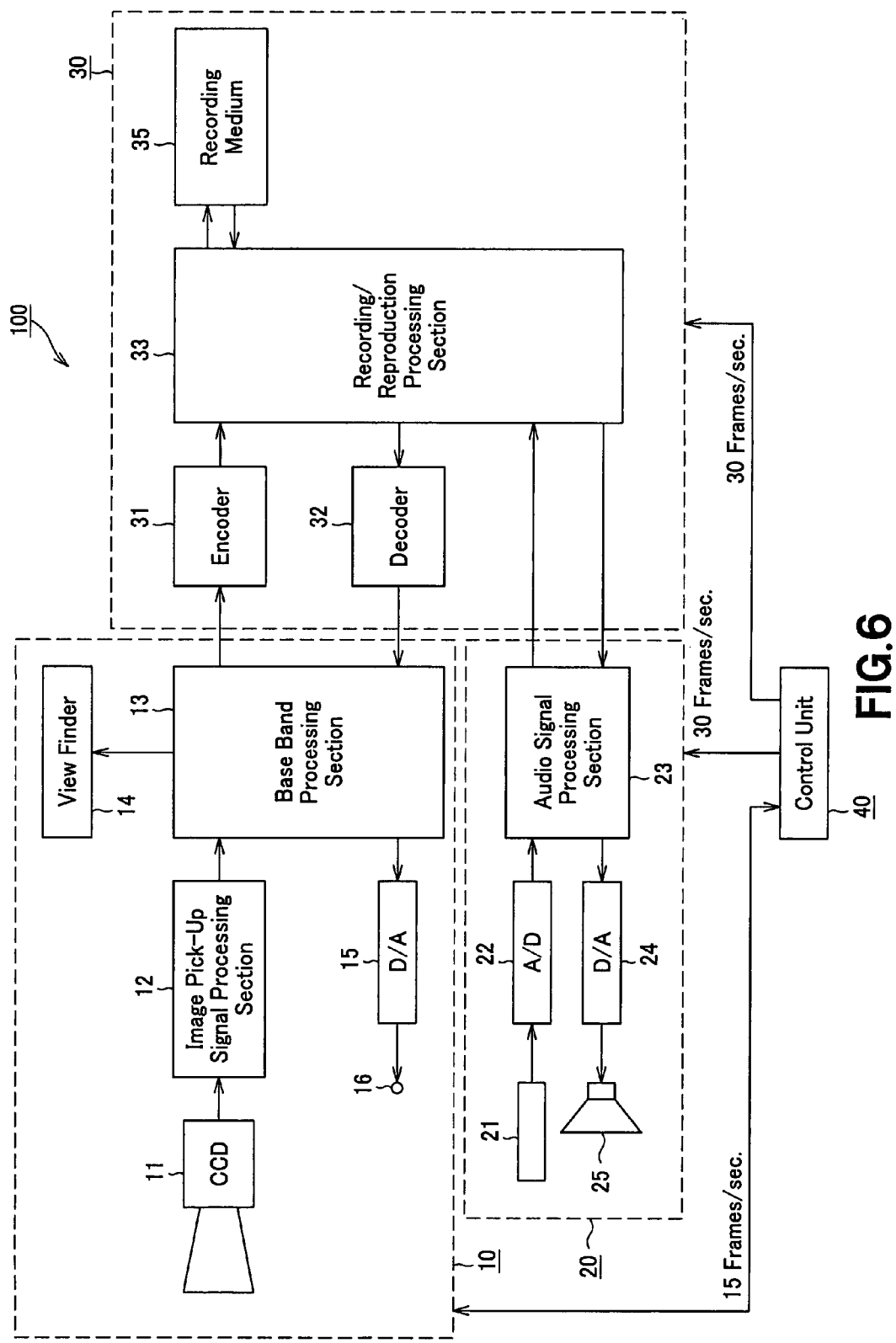
FIG. 6 is a block diagram used for explanation of the operation of the variable speed mode in which variable speed frame rate of 15 frames/sec. is designated in the picked-up image recording/reproducing system.

Moreover, when variable speed mode is set as shown in FIG. 6, for example, and variable speed frame rate except for 30 frames/sec., e.g., 15 frames/sec. is designated, an image signal having designated variable speed frame rate, i.e., 15 frames/sec. is acquired by the image processing unit 10 in this picked-up image recording/reproducing system 100, and an audio signal having the number of frames caused to be in conformity with system frame rate (30 frames/sec.) of an image signal obtained by the image processing unit 10 is generated from an audio signal in which an audio signal which has been obtained by the microphone 21 is digitized.

Figure 7:
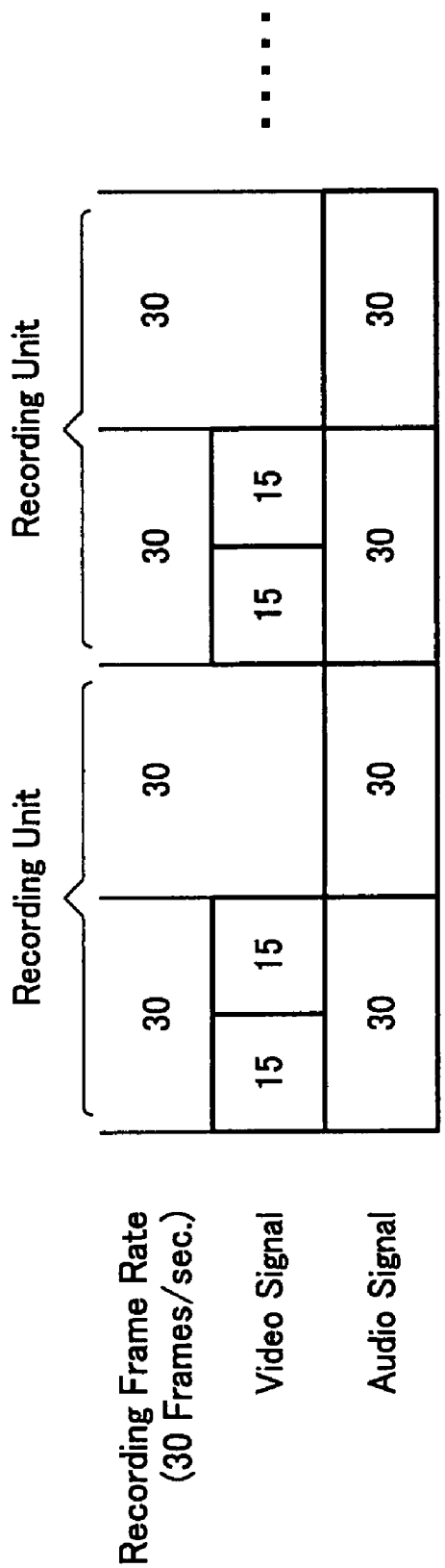
FIG. 7 is a view showing, in a model form, recording state in the variable mode in which the variable speed frame rate of 15 frames/sec. is designated.

As shown in FIG. 7, the recording/reproducing unit 30 serves to collect into A/V data corresponding to 30 frames in which an audio signal having the number of frames caused to be in conformity with system frame rate (30 frames/sec.) which has been generated by the audio processing unit 20 is added to an image signal in which image signal of 15 frames/sec. acquired by the image processing unit 10 is compression-processed by the encoder 31 to generate, by the recording/reproduction processing section 33, a recording signal having recording frame rate (60 frames/sec.) in which error correction code is attached every recording unit to record the recording signal thus obtained onto or into the recording medium 35.

Further, in the case of reproducing the image signal of the variable speed frame rate, i.e., 15 frames/sec. which has been recorded onto or into the recording medium 35, A/V data is reproduced every the recording unit from the recording medium 35 at the recording/reproduction processing unit 33 to thereby obtain compressed image signal of 15 frames/sec. and an audio signal having the number of frames of system frame rate (30 frames/sec.).

The compressed image signal of 15 frames/sec. is caused to undergo expansion processing at decoder 32 to convert it back into the original image signal of 15 frames/sec. so that there results image signal, i.e., signal sequence caused to be closely continuous. The image signal thus obtained is delivered from the base band processing section 13 to the D/A converter 15 as a reproduced image signal of double speed at output frame rate (30 frames/sec.), and is converted into an analog signal by the D/A converter 15. The analog signal thus obtained is outputted from the output terminal 16 to the external.

Moreover, the audio signal having the number of frames of the system frame rate (30 frames/sec.) is converted into a reproduced audio signal of double speed at the audio signal processing unit 12 as the result of the fact that reproduction speed calculated as system frame rate (30 frames/sec.)/variable speed frame rate (15 frames/sec.) from the metadata by the control unit 40, i.e., double speed is designated at the audio signal processing section 23 of the audio processing unit 20 so that it is collected into reproduced audio signal of frame unit. The reproduced audio signal thus obtained is delivered to the D/A converter 24. The reproduced audio signal thus delivered is converted into an analog signal by the D/A converter 24. The analog signal thus obtained is outputted from the speaker 25.

Namely, in the recording system, the image pick-up image recording/reproducing system 100 is operative to record, in generating a recording signal of recording frame rate (60 frames/sec.) from an image signal of variable frame rate (15 frames/sec.) and an audio signal having the number of frames caused to be in conformity with the system frame rate (30 frames/sec.) to record the recording signal thus obtained onto or into the recording medium 35, image pick-up frame rate (15 frames/sec.) and system frame rate (30 frames/sec.), onto or into the recording medium 35 as file along with the image signal of the variable frame rate (15 frames/sec.) and the audio signal having the number of frames caused to be in conformity with the system frame rate (30 frames/sec.). In the reproducing system, the image pick-up recording/reproducing system 100 outputs the image signal of the image frame rate (15 frames/sec.) from the recording medium 35 as a reproduced image signal of double speed at reproduction frame rate (30 frames/sec.), and generates an audio signal at a reproduction rate which has been determined from the ratio between the image pick-up frame rate (15 frames/sec.) and the system frame rate (30 frames/sec.) to reproduce the audio signal at the same speed as that of the reproduction frame rate (30 frames/sec.) to output it to thereby have ability to obtain reproduction outputs of the image signal and the audio signal at double speed.

Figure 8:
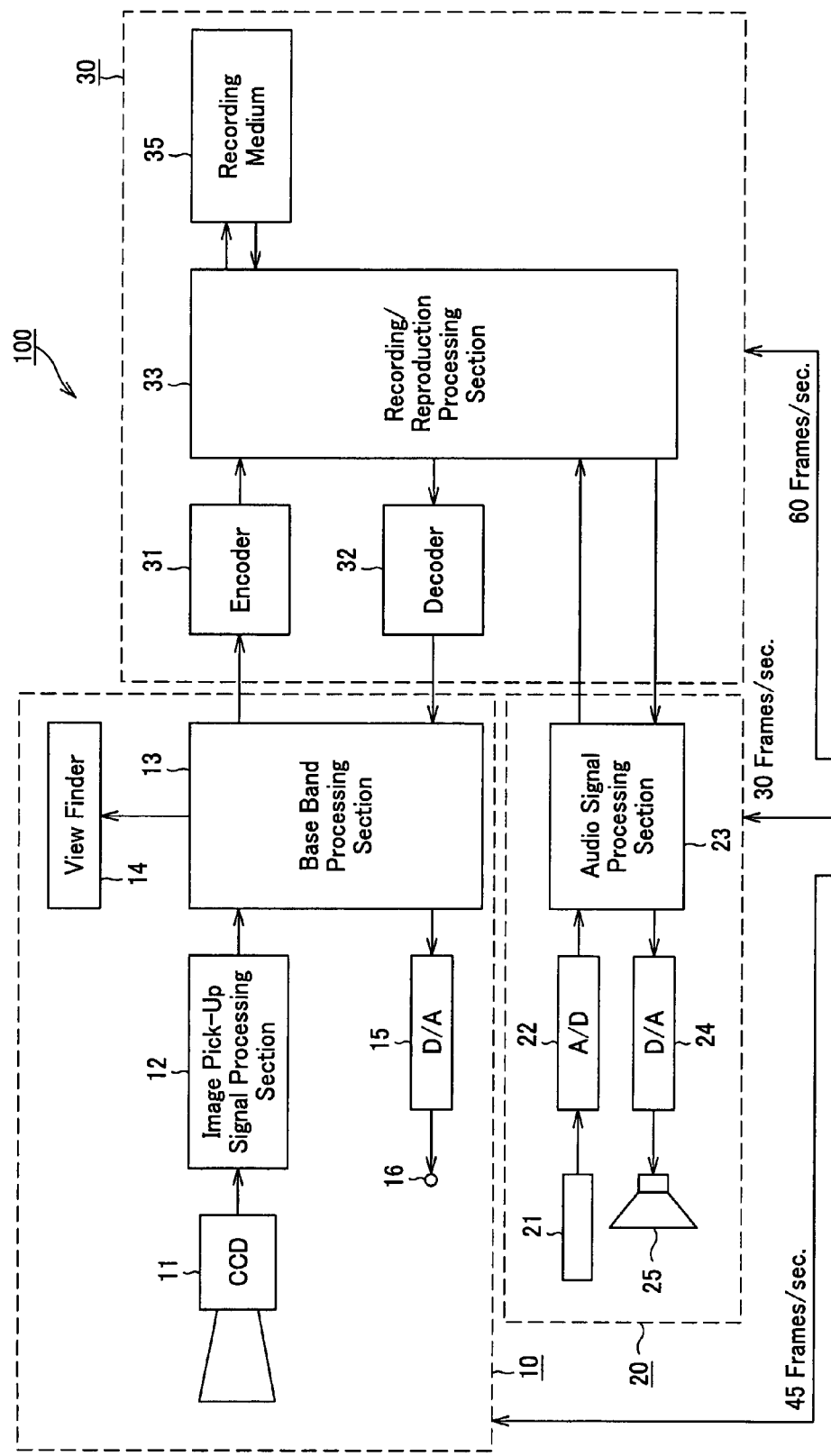
FIG. 8 is a block diagram used for explanation of the operation of the variable speed mode in which variable speed frame rate of 45 frames/sec. is designated in the picked-up image recording/reproducing system.

Moreover, when, as shown in FIG. 8, for example, variable speed mode is set by the control unit 40 and variable speed frame rate except for 30 frames/sec., e.g., 45 frames/sec. is designated, the picked-up image recording/reproducing system 100 is operative to acquire, by the image processing unit 10, an image signal of the designated variable speed frame rate, i.e., 45 frames/sec., and to generate, at the audio processing unit 20, an audio signal having the number of frames caused to be in conformity with the system frame rate (30 frames/sec.) of the image signal obtained by the image processing unit 10 from an audio signal obtained by digitizing the audio signal which has been obtained by the microphone 21.

Figure 9:
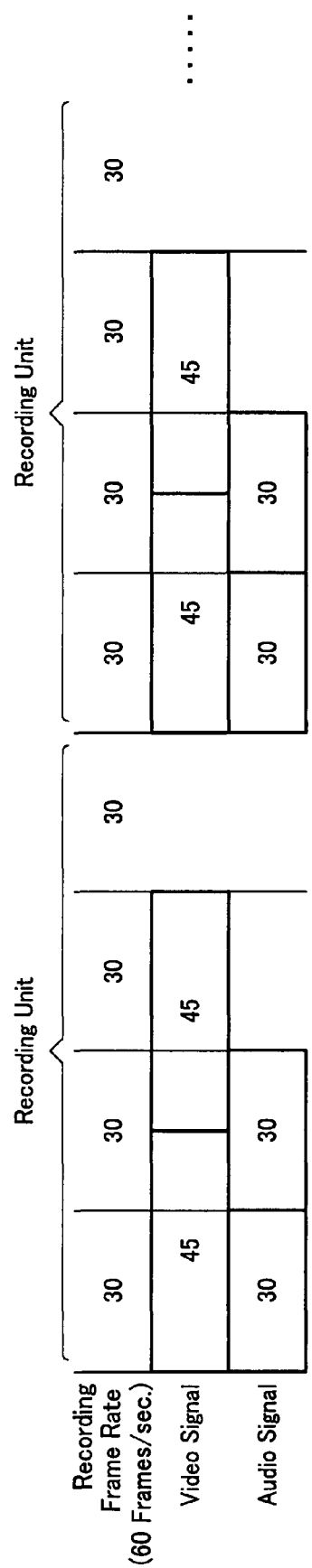
FIG. 9 is a view showing, in a model form, recording state in the variable speed mode where the variable speed frame rate of 45 frames/sec. is designated.

As shown in FIG. 9, the recording/reproducing unit 30 is operative to collect into AN data corresponding to 30 frames by adding an audio signal having the number of frames caused to be in conformity with the system frame rate (30 frames/sec.) which has been generated by the audio processing unit 20 to an image signal obtained by compression-processing, by the encoder 31, the image signal of 45 frames/sec. which has been acquired by the image processing unit 10 to generate, by the recording/reproduction processing section 33, a recording signal of recording frame rate (60 frames/sec.) in which error correction code is added every recording unit to record the recording signal thus obtained into or onto the recording medium 35.

Further, in the case of reproducing the image signal of the variable speed frame rate, i.e., 45 frames/sec. which has been recorded onto or into the recording medium 35, the recording/reproducing processing unit 33 is operative to reproduce, every the recording unit, the A/V data from the recording medium 35 to thereby obtain a compressed image signal of 45 frames/sec. and an audio signal having the number of frames of the system frame rate (30 frames/sec.).

The compressed image signal of 45 frames/sec. is caused to undergo expansion processing at the decoder 32 to thereby convert it back into the original image signal of 45 frames/sec. so that there is provided a continuous image signal, i.e., signal sequence. The image signal thus obtained is delivered from the base band processing unit 13 to the D/A converter 15 as a reproduced image signal of 0.66 times speed at output frame rate (30 frames/sec.), and is converted into an analog signal by the D/A converter 15. The analog signal thus obtained is outputted from the output terminal 16 to the external.

In addition, the audio signal, i.e., signal sequence having the number of frames of the system frame rate (30 frames/sec.) is converted into reproduced audio signal of 0.66 times speed at the audio signal processing section 23 as the result of the fact that reproduction speed calculated as system frame rate (30 frames/sec.)/variable speed frame rate from metadata, i.e., 0.66 times speed is designated at the audio signal processing section 23 of the audio processing unit 20 by the control unit 40 so that such signal components constituting the signal sequence are collected on frame basis. The analog signal thus obtained is delivered to D/A converter 24. The audio signal thus delivered is converted into an analog signal by the D/A converter 24. The analog signal thus obtained is outputted from speaker 25.

Namely, in the recording system, the picked up image recording/reproducing system 100 is operative so that, in generating a recording signal of recording frame rate (60 frames/sec.) from an image signal of variable frame rate (45 frames/sec.) and an audio signal having the number of frames caused to be in conformity with the system frame rate (30 frames/sec.) to record the recording signal of the recording frame rate (60 frames/sec.) onto or into the recording medium 35, it records, onto or into the recording medium 35, as file, image pick-up frame rate (45 frames/sec.) and the system frame rate (30 frames/sec.) along with the image signal of the variable frame rate (45 frames/sec.) and the audio signal having the number of frames caused to be in conformity with the system frame rate (30 frames/sec). Moreover, in the reproducing system, the picked up image recording/reproducing system 100 is operative to reproduce an image signal of the image pick-up frame rate (45 frames/sec.) from the recording medium 35 to output the image signal thus obtained as a reproduced image signal of 0.66 times speed at reproduction frame rate (30 frames/sec.), and to generate an audio signal at a reproduction rate (0.66 times speed) which has been determined from the ratio between the image pick-up frame rate (45 frames/sec.) and the system frame rate (30 frames/sec.) to reproduce the audio signal at the same speed as that of the image signal of the reproduction frame rate (30 frames/sec.) to output the reproduced audio signal thus obtained to thereby have ability to obtain reproduction outputs of the image signal and the audio signal at 0.66 times speed.

As stated above, in this picked up image recording/reproducing system 100, in the variable speed mode, in acquiring an image signal of variable speed frame rate to record/reproduce it by the image processing unit 10, the audio processing unit 20 generates an audio signal having the number of frames of the system frame rate from an audio signal obtained by digitizing an audio signal obtained by the microphone 21 to collect, by the recording/reproducing unit 30, image signal of the variable frame rate and audio signal having the number of frames caused to be in conformity with the variable speed frame rate into A/V data to record/reproduce it through the recording medium 35. Namely, in the variable speed mode, audio signals are recorded by the number of frames of the system frame rate without synchronizing with the image signal on the frame basis.

Thus, it is possible to record/reproduce an image signal of the variable speed frame rate along with an audio signal.

For example, in the picked up image recording/reproducing system, in the case where the frame rate is caused to comply with 24P (24 frames/sec.) of the progressive system, in acquiring, in the variable speed mode, an image signal of the variable speed frame rate (12P) to record/reproduce it by the image processing unit 10, the audio processing unit 20 generates an audio signal having the number of frames of the system frame rate (24P) from an audio signal obtained by the microphone 21, and the recording/reproducing unit 30 serves to collect an image signal of the variable speed frame rate (12P) and an audio signal having the number of frames of the system frame rate (24P) to record/reproduce it at recording frame rate (24P) into A/V data through the recording medium 35. Also in this case, audio signals are recorded without synchronizing with image signal on the frame basis.

In addition, the recording/reproducing unit 30 is operative to generate, as metadata, discrimination information indicating frame of image of variable speed frame rate to record the discrimination information along with an image signal of variable speed frame rate and an audio signal having the number of frames caused to be in conformity with the variable speed frame rate to thereby reproduce, at the time of reproduction, an audio signal caused to be in conformity with the variable speed frame rate of the image signal on the basis of the discrimination information without requiring special processing.

It is to be noted that while the present invention has been described in accordance with certain preferred embodiments thereof illustrated in the accompanying drawings and described in detail, it should be understood by those ordinarily skilled in the art that the invention is not limited to the embodiments, but various modifications, alternative constructions or equivalents can be implemented without departing from the scope and spirit of the present invention as set for by the appended claims.

The invention claimed is:

1. A picked-up image recording apparatus comprising:
    image processing means for picking up an image of an object to output an image signal of variable frame rate;
    audio processing means for acquiring an audio signal to generate an audio signal having the number of frames caused to be in conformity with the system frame rate to output the audio signal thus obtained;
    recording means for recording, onto or into a recording medium, the image signal which has been acquired by the image processing means and the audio signal which has been acquired by the audio processing means; and
    control means for controlling operations of these respective means;
    thus to record, in recording a recording signal of recording frame rate from the image signal of the variable frame rate and the audio signal having the number of frames caused to be in conformity with the system frame rate to record the recording signal of the recording frame onto or into the recording medium, the image pick-up frame rate and the system frame rate along with the image signal of the variable frame rate and the audio signal having the number of frames caused to be in conformity with the system frame rate onto or into the recording medium as file.

2. The picked-up image recording apparatus according to claim 1,
    wherein metadata indicating the number of variable frames and the number of system frames of image pick-up operation are recorded onto or into the recording medium as the recording signal along with the image signal of the variable frame rate and the audio signal having the number of frames caused to be in conformity with the system frame rate.

3. The picked-up image recording apparatus according to claim 1,
    wherein image pick-up frame rate and system frame rate are recorded onto or into the recording medium as MXF (Material Exchange Format) file along with the image signal of the variable frame rate and the audio signal having the number of frames caused to be in conformity with the system frame rate.

4. The picked-up image recording apparatus according to claim 1,
    wherein image pick-up frame rate and system frame rate are recorded onto or into the recording medium as MP4 file along with the image signal of the variable frame rate and the audio signal having the number of frames caused to be in conformity with the system frame rate.

5. A picked-up image recording method comprising the steps of:
    picking up an image of an object to acquire an image signal of variable frame rate, and to acquire an audio signal to generate an audio signal having the number of frames caused to be in conformity with system frame rate; and
    recording, in generating a recording signal of the recording frame rate from the image signal of the variable frame rate and the audio signal having the number of frames caused to be in conformity with the system frame rate thus to record the recording signal of the recording frame rate onto or into the recording medium, image pick-up frame rate as file, along with the image signal of the variable frame rate and the audio signal having the number of frames caused to be in conformity with the system frame rate onto or into the recording medium as file.

6. A picked-up image reproducing apparatus adapted for reproducing, from a recording medium where image pick-up frame rate and system frame rate are recorded as file along with an image signal of variable frame rate at which an image of an object has been picked up and an audio signal having the number of frames caused to be in conformity with system frame rate, the image signal and the audio signal, the picked-up image reproducing apparatus comprising:
    reproduction control means for reading thereinto the image frame rate and the system frame rate from the recording medium to determine reproduction rate of the audio signal from the ratio between the image pick-up frame rate and the system frame rate;
    reproduction image processing means for outputting, as an image signal of reproduction frame rate, an image signal of the variable frame rate which is read out from the recording medium; and
    reproduction audio processing means for generating an audio signal of reproduction rate which has been determined by the reproduction control means from the audio signal having the number of frames caused to be in conformity with the system frame rate which is read out from the recording medium to output the audio signal thus generated;
    thus to generate an audio signal of reproduction rate which has been determined from the ratio between the image pick-up frame rate and the system frame rate to thereby reproduce the audio signal at the same speed as that of the image signal of the reproduction frame rate.

7. The picked-up image reproducing apparatus according to claim 6, wherein, prior to reading out, as the recording signal, from a recording medium where metadata indicating the number of variable frames of image pick-up operation and the number of system frames is recorded along with the image signal of the variable frame rate and the audio signal having the number of frames caused to be in conformity with the system frame rate, the image signal of the variable frame rate and the audio signal having the number of frames caused to be in conformity with the system frame rate, the metadata is read out to acquire the image pick-up frame rate and the system frame rate.

8. The picked-up image reproducing apparatus according to claim 6, wherein, from a recording medium where image pick-up frame rate and system frame rate are recorded as MXF file along with the image signal of the variable frame rate and the audio signal having the number of frames caused to be in conformity with the system frame rate, the image signal and the audio signal are reproduced.

9. The picked-up image reproducing apparatus according to claim 6, wherein, from a recording medium where image pick-up frame rate and system frame rate are recorded as MP4 file along with the image signal of the variable frame rate and the audio signal having the number of frames caused to be in conformity with the system frame rate, the image signal and the audio signal are reproduced.

10. A picked-up image reproducing method of reproducing, from a recording medium where image pick-up frame rate and system frame rate are recorded as file along with an image signal of variable frame rate at which an image of object has been picked up and an audio signal having the number of frames caused to be in conformity with the system frame, the image signal and the audio signal, the picked-up image reproduction method comprising the steps of:

reading thereinto the image pick-up frame rate and the system frame rate from the recording medium to determine reproduction rate of an audio signal from the ratio between the image pick-up frame rate and the system frame rate;

outputting, as an image signal of reproduction frame rate, the image signal of the variable frame rate which is read out from the recording medium, and generating the audio signal of the reproduction rate from the audio signal having the number of frames caused to be in conformity with the system frame rate which is read out from the recording medium to output the audio signal thus generated; and reproducing the audio signal at the same speed as that of the image signal of the reproduction frame rate.

11. A picked-up image recording/reproducing system comprising:

a recording system comprising image processing means for picking up an image of an object to output an image signal of variable frame rate, audio processing means for acquiring an audio signal to generate an audio signal having the number of frames caused to be in conformity with system frame rate to output the audio signal thus obtained, recording means for recording, onto or into a recording medium, the image signal which has been acquired by the image processing means and the audio signal which has been acquired by the audio processing means, and control means for controlling operations of these respective means to record, in generating a recording signal of recording frame rate from an image signal of the variable frame rate and an audio signal having the number of frames caused to be in conformity with the system frame rate to record the recording signal of the recording frame rate onto or into the recording medium, image pick-up frame rate and system frame rate onto or into the recording medium as file along with the image signal of the variable frame rate and the audio signal having the number of frames caused to be in conformity with the system frame rate; and a reproducing system comprising reproduction control means for reading thereinto image pick-up rate and system frame rate from the recording medium to determine reproduction rate of an audio signal from the ratio between the image pick-up frame rate and the system frame rate, reproduction image processing means for outputting, as an image signal of the reproduction frame rate, an image signal of the variable frame rate which is read out from the recording medium, and reproduction audio processing means for generating an audio signal of reproduction rate which has been determined by the reproduction control means from an audio signal having the number of frames caused to be in conformity with the system frame rate which is read out from the recording medium thus to generate an audio signal of reproduction rate which has been determined from the ratio between the image pick-up frame rate and the system frame rate to thereby reproduce the audio signal at the same speed as that of the image signal of the reproduction frame rate.

\* \* \* \* \*